April 7, 1925.
J. W. TAYLOR
1,532,959
TOOL TRIMMING MACHINE
Filed March 17, 1923
2 Sheets-Sheet 1
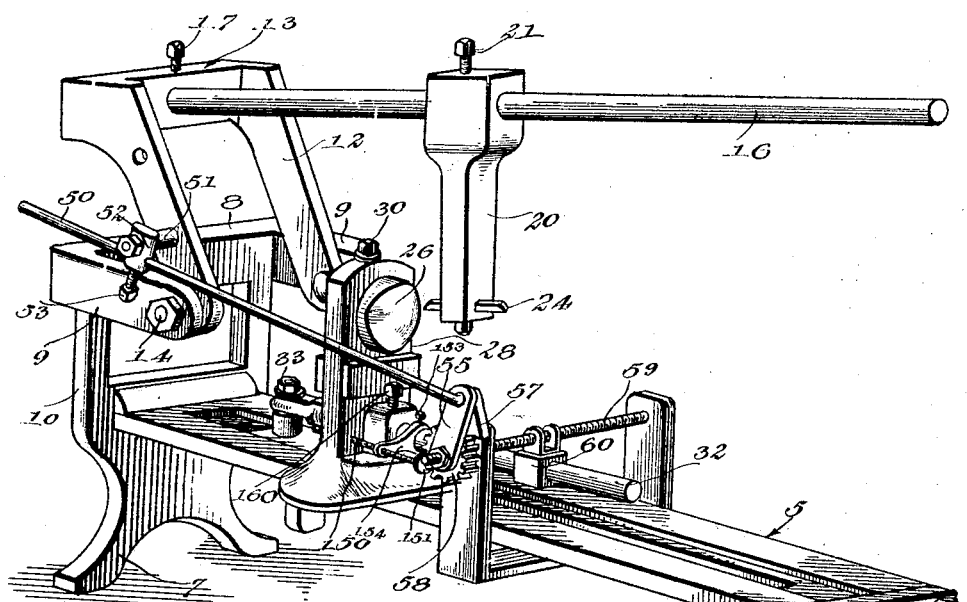

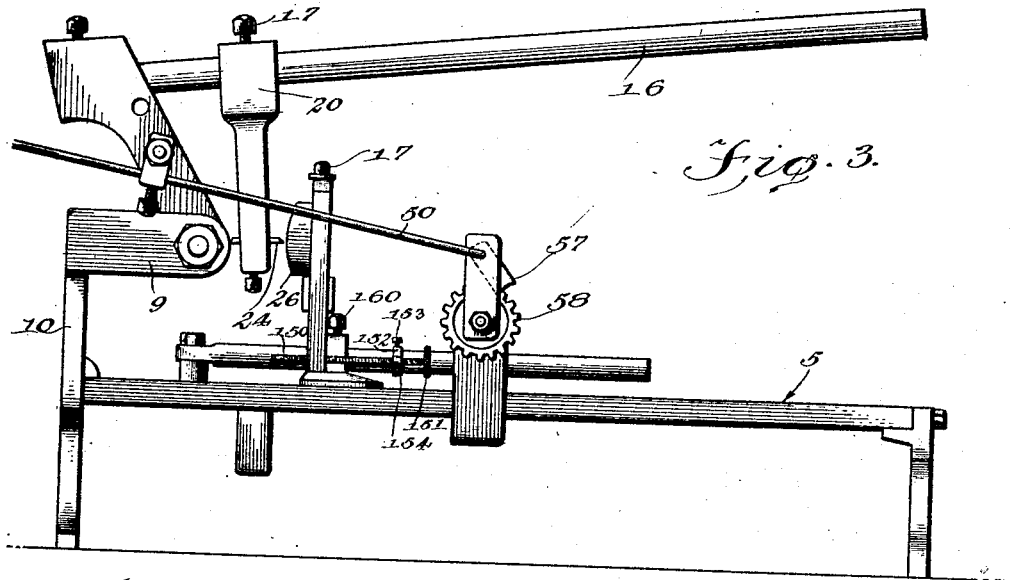

Patented Apr. 7, 1925.

1,532,959

UNITED STATES PATENT OFFICE.

JOHN WASHINGTON TAYLOR, OF GADSDEN, ALABAMA.

TOOL-TRIMMING MACHINE.

Application filed March 17, 1923. Serial No. 625,903.

*To all whom it may concern:*

Be it known that I, JOHN W. TAYLOR, a citizen of the United States, and resident of Gadsden, in the county of Etowah and State of Alabama, have invented certain new and useful Improvements in Tool-Trimming Machines, of which the following is a specification.

This invention relates to tool trimming machines and is especially adapted for use in the manufacture of or subsequent truing of toric tools on which toric spectacle lenses are ground.

Briefly stated an important object of this invention is to provide a machine for making or truing toric tools which is simple to operate, durable in use and cheap to manufacture.

A further object is to provide a tool trimming or making machine which is extremely accurate, capable of a wide variety of adjustments and which may be advantageously employed to form or true a tool so that the same will in turn produce a lens having a radius of curvature in one meridian differing from the radius of curvature in the meridian at right angles thereto.

Other objects and advantages of the invention will be apparent during the course of the following description.

In the accompanying drawings forming a part of this application and in which like numerals are employed to designate like parts throughout the same;

Figure 1 is a perspective of the improved tool manufacturing or truing machine.

Figure 2 is a detail sectional view through the improved machine.

Figure 3 is a side elevation of the machine.

Figure 4 is a longitudinal sectional view through the machine.

In the drawing wherein for the purpose of illustration is shown a preferred embodiment of the invention the numeral 5 designates a bed having supporting legs 6 and 7 at the ends thereof and as illustrated in Figure 1 the leg 7 is formed with a vertical extension 8 to which a pair of arms 9 are connected. It might me said that the arms 9 are formed integral with the extension 10 and extend in parallel relation laterally from the extension.

As illustrated in Figure 1 the branches 12 of a U-shaped yoke 13 are pivoted as indicated at 14 to the terminals of the horizontal arms 9 and a lever or beam 16 is rigidly secured to the bight portion of the U-shaped yoke by the set screw 17 or other suitable fastening device.

The lever or beam 16 carries a tool holder 20 and the tool holder may be secured in an adjusted position on the lever by a set screw 21 or otherwise. It will be observed that the lower terminal portion of the holder 20 carries a cutter 24 which is moved in an arcuate path by the vertical movement of the lever 16.

The cutter 24 engages the surface of a toric tool 26 employed in grinding toric lenses and the toric tool which in this case will be designated "work" is secured to a chuck 28 by a fastening device 30 of any suitable type and the chuck 28 is mounted on a lever 32 extending longitudinally of the bed and pivotally secured thereto as indicated at 33. It will be seen that the lever 32 moves about a vertical axis while the beam 16 moves about a horizontal axis or about an axis at right angles to the axis of the pin 33. It might be stated that the vertical movement of the cutter 24 gives the desired radius of curvature in the perpendicular meridian. This curve is known as the base curve and may be set at any fraction of a diopter from 1.00 diopter to 10.00 diopters.

As the main lever 16 is operated in a vertical plane, it imparts a longitudinal movement to a link 50 connected to a pin 51 of the attaching member or yoke 12 through the medium of a swivel member 52. Figure 1 illustrates that the swivel member 52 is adjustably secured to the link 50 by a set screw 53. One end of the link 50 is provided with an attaching member or bar 55 and with a pawl 57 which engages a ratchet wheel 58 mounted on a feed screw 59. More specifically the ratchet wheel 58 is rigidly secured to the feed screw so that when the pawl 57 is operated by the movement of the link 50 the feed screw will be rotated in one direction. Of course the pawl 57 is reversable and may be swung into engagement with either side of the ratchet wheel whereby the feed screw is operated in the proper direction.

When the feed screw is operated it imparts movement to a feed nut 60 mounted thereon and having connection with the lever 32, which lever feeds the work to the cutter.

The chuck 28 may be adjusted longitudinally of the lever 32 by means of a feed screw 150 threaded through the chuck and having its rear portion formed with a hand wheel 151.

The rear portion of the feed screw is connected to the lever 32 by means of a latterally projecting bracket 154, the said bracket being connected to a collar 152 adjustably secured upon the lever 32 by means of a set screw 153. It will be seen that by rotating the feed screw 150 the chuck 28 will be caused to move longitudinally on the base and the lever 32. After the chuck has been adjusted on the lever a set screw 160 is tightened for securing the chuck to the lever.

However, the foregoing method of adjusting is only used for minor adjustments and in the case of major adjustments the set screws 153 and 160 are loosened so that the chuck may be moved to any desired position on the shaft and smaller adjustments may subsequenlty be made.

In use the toric tool to be trued or the casting for a new tool is made secure in the chuck 28 and the cutter 24 is set at any desired distance from the center of motion of lever 16 at the pivot point 14 by moving the tool holder longitudinally on the lever 16.

The vertical movement of the main lever 16 will cut the greater or base curve. In setting the machine the center of motion of the lever 32 at the pivot point 33 is set to the right of the center of motion of the lever 16 the proper distance by graduations on the bed to produce a shorter radius from the pivot point 33 to the work 26. The difference of the radii of the cutter and the work 26 determines the dioptric power or cylindrical power of the toric surface. After the machine is set the work is done by raising and lowering the lever 16 by hand and this carries the cutter on its set radius and the lever 32 is moved in a horizontal direction as previously stated. The work is brought against the cutter by moving the chuck or work holder 28 on the horizontal lever 32 and it will be readily seen that when it is desired to produce a concaved toric surface the cutter 24 is arranged at one side of the work and when it is desired to produce a convex toric surface the cutter is located at the opposite side of the work.

With reference to the foregoing description taken in connection with the accompanying drawing it will be seen that a machine constructed in accordance with this invention is economical to operate and is capable of a wide variety of adjustments, by means of which a toric surface of the desired curvature may be produced.

Having thus described the invention, what I claim is:—

1. A machine of the class described comprising a bed, a vertically movable lever having an attaching member horizontally pivoted to said bed, a tool holder mounted on said lever and adapted for vertical movement in an arcuate path, a cutter carried by said holder, a work supporting chuck mounted on said bed, a horizontal lever for moving said chuck horizontal in an arcuate path, and means operated by the attaching member of said first named lever for moving the horizontal lever transversely of the bed.

2. A machine of the character specified comprising a bed, a yoke pivoted thereto and adapted for movement about a horizontal plane, a main lever secured to the yoke, a tool holder adjustable on the lever and having a cutting tool, a work supporting chuck having means for supporting work in the path of travel of said cutter, and means whereby to move the chuck about an axis at right angles to the pivot point of said yoke during the movement of said lever.

3. A machine of the character specified comprising a bed, a yoke pivoted to one end of said bed, a main lever connected to said yoke, a tool holder mounted on said lever and having a cutter, a chuck mounted on said bed and having means to support work in the path of travel of said cutter, a second lever having connection with said chuck and being pivoted to the bed, the pivot point of said second named lever being at right angles to the axis of the pivot of said yoke, and means operated by said yoke for moving said second named lever transversely of the bed during the movement of said first named lever.

4. A machine for producing toric surfaces comprising a bed, a lever having a yoke pivoted to the bed, a tool holder mounted on the lever and provided with a cutter, a work holding chuck mounted on the bed and having means for supporting the work in the path of travel of said cutter, a lever pivoted to said bed and having connection with said chuck, a feed screw having a feed nut connected to said second named lever, a ratchet wheel connected to said feed screw, a pawl associated with said ratchet wheel, a link connected to said yoke and to said pawl whereby the movement of said pawl operates said yoke and turns said feed screw, for moving the lever pivoted to the bed transversely of the bed.

5. A machine for producing toric surfaces comprising a lever having a laterally projecting attaching yoke, means pivotally supporting the yoke, a tool holder adjustable on said lever and having a cutter, said lever being adapted for operating said cutter to produce the major curve in the work, a work holding chuck having means to support the work in the path of travel of said cutter, and means whereby to move the work about an axis transversely to the axis about which said first named lever operates whereby to produce the minor curves in the work.

6. A machine of the character specified comprising a movable holder adapted for supporting a cutter, a lever pivotally supported adjacent one end thereof and movable at right angles to the path of travel of the holder, a chuck having connection with and to move in a horizontal arcuate path by said lever and having work supporting means, and means operated by the movement of said holder and connected to said lever outwardly of said chuck to move said lever transversely of the path in which the holder travels, said chuck being located between the pivot points of the lever and the opposite end of the lever.

7. A machine of the character described comprising a lever, means at one end of the lever for pivotally supporting the same for movement about a substantially vertical axis, a chuck connected with the lever intermediate the ends thereof and adapted for supporting work, a tool holding member movably arranged adjacent said chuck, and means operated by said tool holding member and connected to said lever outwardly of said chuck and at a point spaced from the same to move the lever and the chuck back and forth in a substantially horizontal path.

JOHN WASHINGTON TAYLOR.